UNITED STATES PATENT OFFICE.

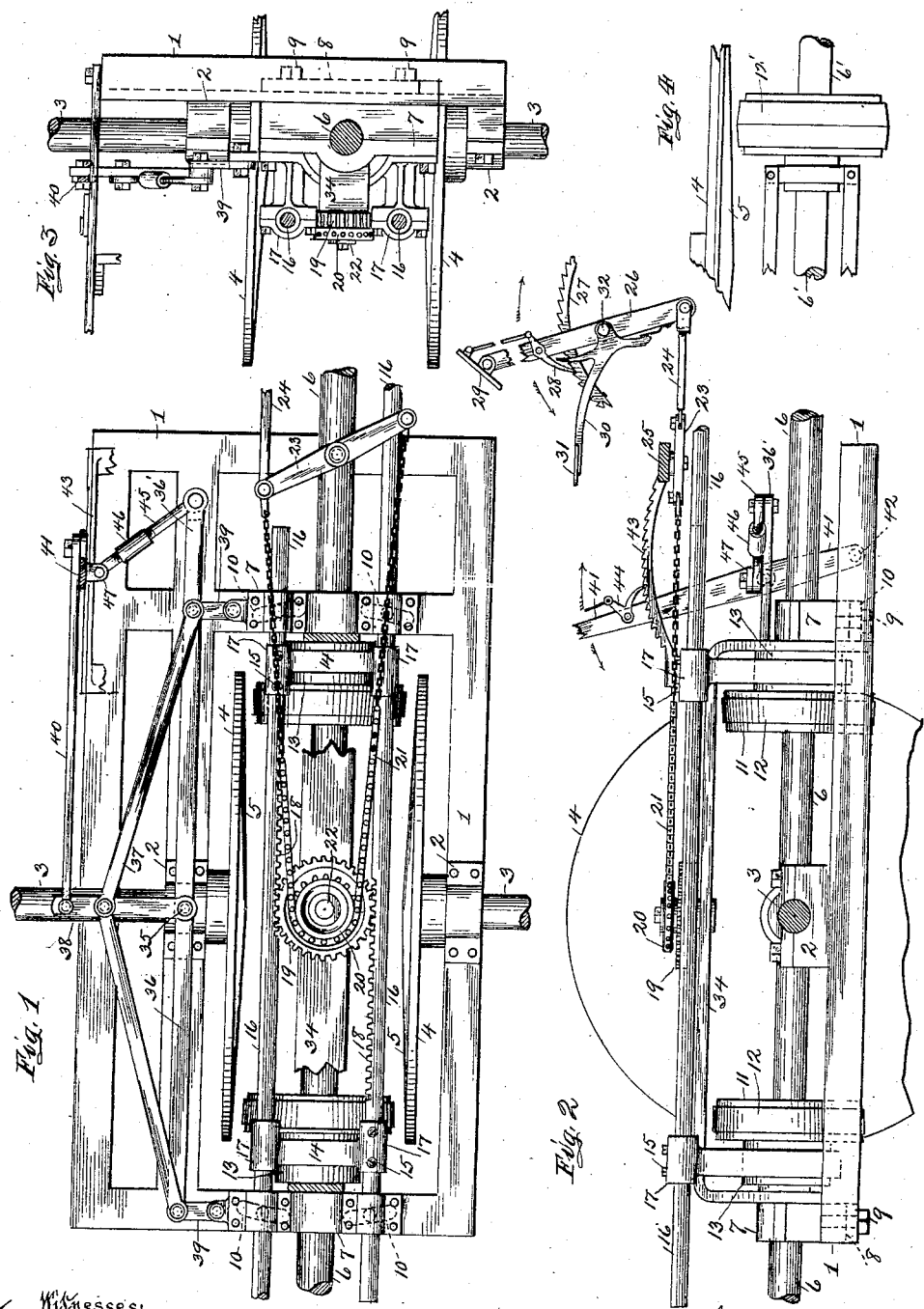

JOSEPH BARTOSIK AND PETER KRUMMEL, OF PITTSBURG, PENNSYLVANIA.

REVERSIBLE AND VARIABLE-SPEED POWER-TRANSMITTING DEVICE.

No. 880,856.

Specification of Letters Patent.

Patented March 3, 1908.

Application filed May 17, 1906. Serial No. 317,283.

*To all whom it may concern:*

Be it known that we, JOSEPH BARTOSIK and PETER KRUMMEL, citizens of the United States, residing at Pittsburg, in the county of Allegheny and State of Pennsylvania, have invented certain new and useful Improvements in Reversible and Variable-Speed Power-Transmitting Devices; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a reversible and variable-speed transmitting mechanism, and it comprises a rotatable drive-shaft with limited lateral movement, slidable friction wheels or spools mounted on said shaft and means for moving the same towards or away from the center of oppositely-disposed parallel-arranged disks with conical faces, adapted to operate the drive-wheels of a motor-vehicle or other apparatus wherein a reversible power or variable-speed is desired and wherein the power is frequently thrown on and off, and the invention further consists in the certain details of construction and combination of parts, as will be fully described hereinafter.

In the accompanying drawings—Figure 1 is a plan view of our improved variable-speed transmitting mechanism, adapted for use on motor vehicles, a part of which is broken away to show the arrangement of the sliding friction wheels beneath, the said view showing the general construction and arrangement of our invention. Fig. 2 is a side elevation of the same, one of the conical faced disks being removed therefrom, and in addition the construction and location of the operating levers are shown. Fig. 3 is an end elevation of the mechanism. Fig. 4 is a plan view of a portion of one of the conical faced disks and a modified form of the bevel friction wheel.

To put our invention into practice and give the same bodily form, we provide a frame 1, of a suitable size and construction, and mount thereon in bearings 2, oppositely-disposed shafts 3, each being fitted at their inner ends with large disks 4, the one disk being parallel with the other, and each being formed or provided with conical surfaces 5, which may be integral and of the same material or attached and of a more adhesive substance to give better frictional contact with the operating wheels 11. These operating wheels 11 (two in number,) are beveled and slidably mounted on a drive-shaft 6, in such manner as to rotate therewith, and the said drive-shaft supported in bearings 7, which are connected to the frame 1 by plates 8 and bolts 9, the said bolts passing through slots 10 formed in the frame, each slot being a segment of a circle, the center of which is in a line perpendicular to the axis of the shafts 3, carrying the friction disks 4, in such manner that the said bearings 7 may be free to move a limited distance about said axial center.

At the rear of each of the friction cones 11 and connected thereto are ball-bearings (not shown) which are inclosed within casings 13, to take the end thrust of said cones, and to these casings 13 are connected frames 17 having guides with horizontal bore in which parallel-arranged bars 16 are made to operate. These bars 16 are firmly attached by screws 15 at diagonally opposite corners of the two frames, and are provided along a part of their length with racks 18, which are in mesh with a toothed wheel 19 supported on a supplemental frame 34 connected to the bearings 7. To this toothed wheel 19 is attached a sprocket 20 in order that both shall rotate in unison, said rotation being derived from a sprocket chain 21, connected at both ends of a pivoted lever or bar 23, and the said bar connected by a link 24 to a lever 26, within reach of the foot of the operator. The lever 26 is pivoted at 32 to the vehicle, and is fitted with a treadle 29, a releasing and locking pawl 28, and a supplemental lever 30 also formed with a foot piece 31, an integral releasing dog operating with said pawl 28 and with a spring to hold said supplemental lever in its normal position. By means of this double foot lever 26, 30, the sprocket 20 may be revolved in either direction, the operator thrusting the lever 26 away from him or bearing down upon the lever 30 will give the said sprocket the desired rotation. This movement of the sprocket 20 is transmitted to the wheels 11 to bring the same towards or move them away from the center of the friction disks, thereby varying the speed and power transmitted by said wheels to the conical-faced friction disks 4.

To throw the drive-shaft 6 out of alinement in order that the friction-wheels 11 may be engaged at the same time with the opposite-disposed friction disks and rotate the latter simultaneously in the same direction, links 39 are connected to the bearings 7 and to a horizontal lever 36 pivoted at its center 35, to the bearing 2 beneath and attached to another lever 38 at right angles to the first mentioned. These two levers 36 and 38 are connected to a vertically-disposed hand-lever 41, pivoted at 42, to the frame 1, the connections being made with the lever 38 by means of a link 40, and with the lever 36 by a divided bar 45, coupled by an adjusting threaded sleeve 46. This hand lever 41 is fitted with a locking pawl 44, to engage with a rack 43, in a manner common in the art. By thus compounding the levers for the lateral movement of the drive-shaft and its attached friction wheels great power is obtained to place suitable pressure between the driving and driven mechanism.

In adapting the above-described mechanism to motor-cars or vehicles, the friction wheels 11 are movable along the length of the drive-shaft towards or away from the centers of the friction disks, and when in contact will vary the speed or change the direction of the rotation of said disks.

In providing the friction disks 4 with conical faces 5 and the drivers in the form of frustums of cones, the entire line of bearing is maintained when the disks and cones are brought in frictional contact, thereby giving a greater frictional contact to the parts.

It will be noticed by this construction and arrangement of the driving and driven parts, the drivers engage with opposite disks and can be operated from the extreme periphery or in close contact at either side of the centers of said disks, to obtain the maximum speed or maximum power from the drive-shaft 6, and transmit said speed or power to the driving wheels of the motor-vehicle, geared or connected to the shafts 3, carrying said disks.

To change the direction of the rotation of the friction disks 4, it is only necessary to operate the hand lever 41, to shift the driving wheels 11 to engage in opposite relation with the friction disks 4, or each of said cones bearing against one of the disks. The wheels when shifted from one position wherein they engage with opposite disks to the reverse position and made to engage in opposite relation, will change the direction of rotation of said disks.

At Fig. 4 of the drawings we have shown a modified form of the invention, in which a single wheel with double conical face 12' is provided, adapted to operate in connection with a single conical-faced disk, the former capable of moving beyond the center of the latter to reverse the movement. In this modified form the disk 4 is arranged to move toward the cone instead of the cone toward the disk, as above described.

Considerable variation of the details of the invention from those shown in the drawings, may be made without departing from the spirit or scope thereof.

Having thus described our invention, we claim—

1. In combination, alining shafts, disks on the adjacent ends of the shafts, the opposed faces of the disks being conical, a drive shaft passing between the disks friction rolls on the drive shaft movable on the shaft, a frame movable on each of the rolls, a bar secured to each frame and slidable through the remaining frame, and means engaging the bars to impart movement thereto.

2. In combination, alining shafts, disks on the adjacent ends of the shafts, the opposed faces of the disks being conical, a drive shaft passing between the disks, friction rolls on the drive shaft movable on the shaft, a frame movable on each of the rolls, a bar secured to each frame and slidable through the remaining frame, and means engaging the bars to impart movement thereto simultaneously.

3. In combination, alining shafts, disks on the adjacent ends of the shafts, the opposed faces of the disks being conical, a drive shaft passing between the disks, friction rolls on the drive shaft movable on the shaft, a frame movable on each of the rolls, a bar secured to each frame and slidable through the remaining frame, and means engaging the bars to impart movement therein in opposite directions.

4. In combination, alining shafts, disks on the adjacent ends of the shafts, the opposed faces of the disks being conical, a drive shaft passing between the disks, friction rolls on the drive shaft movable on the shaft, a frame movable on each of the rolls, a bar secured to each frame and slidable through the remaining frame, means engaging the bars to impart movement thereto, teeth on the bars, a toothed wheel engaging the teeth of the bar, and means for rotating the toothed wheel.

In testimony whereof, we affix our signatures, in presence of two witnesses.

JOSEPH BARTOSIK.
PETER KRUMMEL.

Witnesses:
  WM. G. WALTER,
  O. A. HENSEL.